United States Patent
Teglia et al.

(10) Patent No.: US 8,411,859 B2
(45) Date of Patent: Apr. 2, 2013

(54) NON-DETERMINISTIC NUMBER GENERATION

(75) Inventors: Yannick Teglia, Marseilles (FR); Pierre-Yvan Liardet, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 1274 days.

(21) Appl. No.: 11/481,298

(22) Filed: Jul. 5, 2006

(65) Prior Publication Data
US 2007/0116289 A1 May 24, 2007

(30) Foreign Application Priority Data
Jul. 5, 2005 (FR) .................................. 05 52046

(51) Int. Cl.
*H04L 9/00* (2006.01)
*H04K 1/00* (2006.01)

(52) U.S. Cl. ......... 380/268; 380/269; 380/217; 713/189

(58) Field of Classification Search .................. 708/250; 380/263, 269, 268
See application file for complete search history.

(56) References Cited

U.S. PATENT DOCUMENTS

| 5,635,931 | A | * | 6/1997 | Franaszek et al. | 341/51 |
| 6,122,379 | A | * | 9/2000 | Barbir | 380/269 |
| 6,430,170 | B1 | | 8/2002 | Saints et al. | |
| 7,184,597 | B1 | * | 2/2007 | Aronov | 382/232 |
| 2004/0076293 | A1 | * | 4/2004 | Smeets et al. | 380/46 |

FOREIGN PATENT DOCUMENTS
WO    WO 97/11423 A2    3/1997

OTHER PUBLICATIONS

"Communication Theory of Secrecy Systems" C.E Shannon, 1949.*
French Search Report from French Patent Application 05/52046, filed Jul. 5, 2005.
Patent Abstracts of Japan vol. 2000, No. 10 & JP 2000 194537 A (NEC Corp.), Jul. 14, 2000.

* cited by examiner

*Primary Examiner* — Taghi Arani
*Assistant Examiner* — Mohammad L Rahman
(74) *Attorney, Agent, or Firm* — Wolf, Greenfield & Sacks, P.C.

(57) ABSTRACT

A method for determining the entropy of a noise source providing a bit flow, a method and a device for generating a bit flow, including parallelizing the bit flow to obtain first words over a first number of bits, applying to the successive words a compression function, and evaluating a second number of bits over which the compression function provides its results, the second number representing the number of useful bits in the first words.

19 Claims, 1 Drawing Sheet

NON-DETERMINISTIC NUMBER GENERATION

BACKGROUND OF THE INVENTION

1. Field of the Invention

The present invention generally relates to the non-deterministic determination of numbers and more specifically to the processing of a bit flow provided by a non-deterministic noise source (desired to be random).

The present invention, for example, applies to the non-deterministic generation of digital quantities intended to form ciphering or authentication keys used in cryptographic functions.

2. Discussion of the Related Art

The generation of a bit flow to form digital quantities in non-deterministic fashion uses a noise source capable of providing, directly or after conversion, a flow of binary states. The noise source may be digital or analog and exploit various disturbances (thermal noise, frequency variation, of an oscillator, etc.). The bit flow is generally exploited by words of fixed size (number of bits). The bit sequence distribution which characterizes the generator quality regarding the random character is evaluated by taking into account the desired word size.

It is frequently attempted to improve the random character of a bit flow by submitting it to processings downstream of the noise source. Such is the case, for example, for devices known as debiasers.

However, another problem regarding the generation of numbers, especially to form authentication or ciphering keys relates to the bit flow entropy, that is, the amount of useful information borne with respect to the number of transmitted bits. This phenomenon can be understood by considering a 64-bit word formed by the repeating of 8 identical bytes having equiprobable bit combinations. The useful information only comprises 8 bits, the other bits of the 64-bit word bearing no non-redundant information. The entropy then is one eighth with respect to a maximum entropy (1).

For example, a digital quantity generator to form a ciphering or authentication key over 1,024 bits cannot be considered as effectively providing keys over 1,024 bits if the representation of these keys is not optimal regarding entropy, that is, if some bits contain no useful information. The entropy is calculated according to the size of the words taken into account with respect to the possible repeating of sequences of lower sizes in the flow generated in non-deterministic fashion. Assuming that each byte in fact has a single entropy bit (entropy of one eighth), this amounts to stating that the key over 1,024 bits is equivalent to a key over 128 bits.

To qualify a random number generator, statistic entropy tests are conventionally performed by examining the results a posteriori to determine the number of information-bearing bits per word.

An example of such a test method is described in article "On the Security of Random Sources" by J-S. Coron published in 1999 in H. Imai and Y. Zheng (Eds.): PKC'99, LNCS 1560, pp. 29-42 (Springer Verlag).

A disadvantage of such statistic solutions is that they require significant and long calculations. In fact, the tests are performed on characterization of the non-deterministic generator, due to the number of required samples (several millions). It cannot be envisaged to integrate such mechanisms in the manufactured product, for example, for periodic evaluations throughout the product lifetime.

SUMMARY OF THE INVENTION

The present invention aims at overcoming all or part of the disadvantages of electronically-generated bit flow entropy test mechanisms.

The present invention more specifically aims at checking in real time the quality of the generated bit flow as far as its entropy is concerned.

The present invention also aims at providing a generator of bit words originating from a non-deterministic source, all the bits of which carry useful information.

To achieve all or part of these objects as well as others, the present invention provides a method for determining the entropy of a noise source providing a bit flow, comprising the steps of:

parallelizing the bit flow to obtain first words over a first number of bits;

applying a compression function to the successive words; and evaluating a second number of bits over which said compression function provides its results, the second number representing the number of useful bits in the first words.

According to an embodiment of the present invention, the compression function is a Huffman function.

The present invention also provides a method of non-deterministic word generation from a noise source providing a bit flow, comprising the steps of:

parallelizing the bit flow provided by the noise source to obtain first words over a first number of bits;

applying in parallel to said first words a compression function providing second words over a second number of bits and a diffusion/confusion function providing third words over a third number of bits; and selecting a number of bits equal to the second number in the third words.

According to an embodiment of the present invention, the diffusion/confusion function is a hash function, preferably selected from among functions SHA1 and MD5.

According to an embodiment of the present invention, the diffusion/confusion function is a ciphering algorithm, preferably, of DES type.

The present invention also provides a non-deterministic generator of numbers from a noise source providing a bit flow, comprising:

a function for compressing first words over a first number of bits obtained from the noise source, providing second words over a second number of bits;

a function of diffusion/confusion of said first words; and a selector of a number of bits equal to the second number in words resulting from the diffusion/confusion function.

According to an embodiment of the present invention, the diffusion/confusion function is a hash function, preferably selected from among functions SHA1 and MD5.

According to an embodiment of the present invention, the diffusion/confusion function is a ciphering function, preferably of DES type.

According to an embodiment of the present invention, the compression function is a Huffman function.

The foregoing and other objects, features, and advantages, of the present invention will be discussed in detail in the following non-limiting description of specific embodiments in connection with the accompanying drawings.

DETAILED DESCRIPTION

Figure 1:
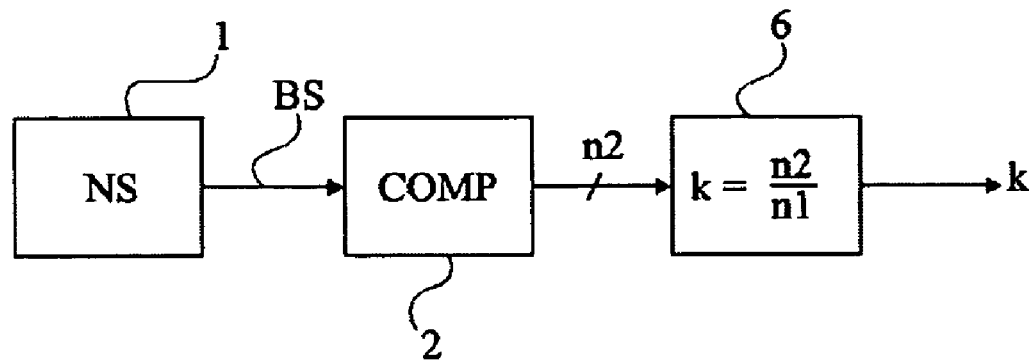
FIG. 1 very schematically shows in the form of blocks an embodiment of a method for determining the entropy of a bit flow according to the present invention.

The same elements have been designated with the same reference numerals in the different drawings. For clarity, only those steps and elements which are useful to the understanding of the present invention have been shown in the drawings and will be described hereafter. In particular, the forming of the noise source providing the initial bit flow tested or processed by the present invention has not been described in detail, the present invention being compatible with any conventional bit source providing a bit flow. Similarly, the exploitation that is made of the digital words generated by the present invention has not been described in detail, the present invention being here again compatible with any conventional exploitation of digital quantities generated in non-deterministic fashion.

A feature of an embodiment of the present invention is to use a compression function to estimate the number of useful bits provided by a non-deterministic bit source. According to the present invention, the compression function is used to determine the ratio between the number of useful bits and the number of input bits and not to provide bits, conversely to the current use of such a compression function.

A compression function is characterized by the fact that the more often a piece of data appears in a set of data, the less the function requires space (bits) to represent it. Conversely, the more seldom a piece of data of data appears in a set of data, the more space (bits) is used. It can thus be seen that as applied to a binary word set, the greater the number of repeated words, the lower the number of bits required to represent these words (make out the words from one another).

FIG. 1 very schematically shows in the form of blocks an embodiment of the method for estimating the entropy of a bit flow BS provided by a noise source 1 (NS). A compression function 2 (COMP) provides words over n2 bits based on n1-bit words built from bit flow BS. A function 6 (hardware or software) calculates ratio k between numbers n2 and n1, after having evaluated number n2 (and possibly number n1).

By applying compression function 2 to a set of several words over n1 bits derived from noise source 1, a set of words over n2 bits is obtained, with n2 smaller than or equal to n1. Ratio n2/n1 determines ratio k of the compression function. In fact, number n2 represents the number of bits to be taken in the n1-bit words to only obtain useful bits.

Thus, the present invention uses number k to determine the entropy of the bit flow provided by noise source 1, as being equal to the ratio of the compression function.

The number of words to be taken into account depends on the size (n1) of the input words. The greater the number of words in the set, the more reliable the result, and the greater number n1, the greater the number of words in the set must be. For example, the set of words comprises at least $2^{2n1}$ words.

As an example, a Huffman compression function such as described in "A Method for the Construction of Minimum-Redundancy Codes", published in Proceedings of the I.R.E., 40, September 1952, may be used.

According to another example, a compression function described in "Arithmetic Coding+Statistical Modeling=Data Compression", Part 1—Arithmetic Coding of Mark Nelson, published in "Dr. Dobb's Journal", February 1991, may be used.

According to a first embodiment, the method of the present invention is used to characterize the entropy of a non-deterministic generator. The greater the number k, the better the quality in terms of non-deterministic character of the generator, and thus the more efficient the noise source is to generate words in non-deterministic fashion.

According to another embodiment, the method illustrated in relation with FIG. 1 is used to, from a noise source providing a bit flow, generate words forming ciphering or authentication quantities.

Figure 2:
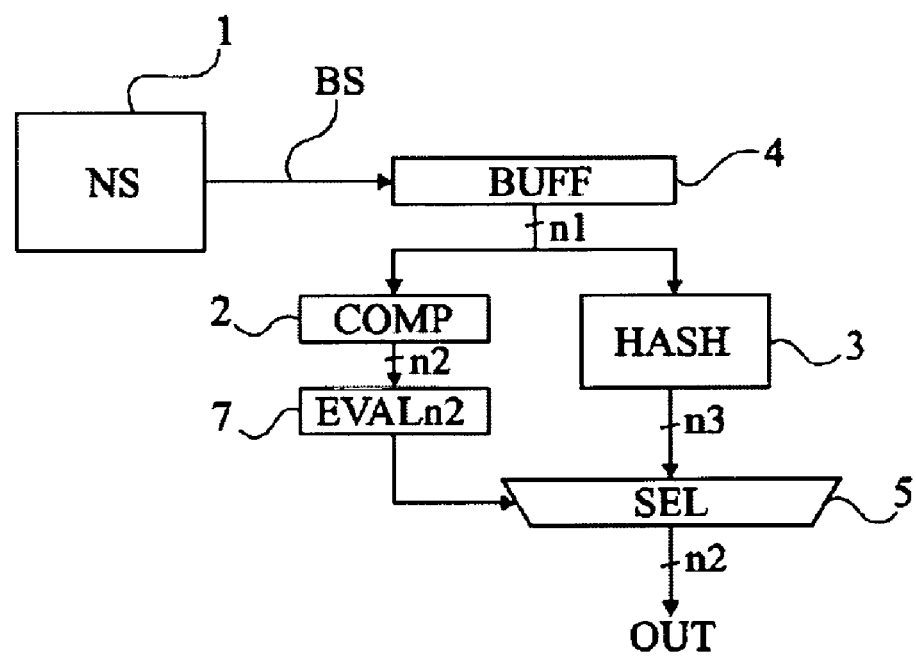
FIG. 2 very schematically shows in the form of blocks an embodiment of a non-deterministic generator of binary words according to the present invention.

FIG. 2 schematically shows in the form of blocks an embodiment of a non-deterministic number generator according to the present invention exploiting the qualification method illustrated in FIG. 1 to select, in the generated bit flow, a number corresponding to the number of useful bits.

As in the case of FIG. 1, the bit flow originating from noise source 1 is processed by a word over n1 bits. In FIG. 2, a temporary storage element 4 (BUFF) is assumed, for example, registers used to parallelize flow BS over n1 bits and to store a set of words (in FIG. 1, this function is assumed to be comprised in block 2).

The n1-bit words are submitted in parallel to a compression function 2 of the type described in relation with FIG. 1 providing words over n2 bits and to a diffusion/confusion function, for example, a hash function 3, which stirs the n1 bits and provides words over n3 bits with n3 smaller than or equal to n1. A hash function is characterized by the fact that knowing the resulting data, it is difficult to go back to the input data, and by the fact that it is deprived of collision, that is, it is impossible to find two data providing the same result.

As a variation, functions 2 and/or 3 manipulate series bit flow BS and are in charge of obtaining the words over n2 and n3 bits. According to another variation, noise source 1 provides n1-bit words.

Any hash function may be used, for example, the functions known as SHA1 and MD5. As a variation, a DES-type cryptography algorithm (Data Encryption Standard) may also be used to mix the bits in function 3.

According to this embodiment of the present invention, number n2 of bits at the output of compression function 2 is evaluated (block 7, EVAL n2) and is used to select (block 5, SEL) n2 bits from the n3-bit words provided by the hash function. As a result, the words over n2 bits provided by selector 5 only contain useful bits (bearing information). These words are then exploited as digital quantities according to the application. It should be noted that the content of the words provided by function 2 is not exploited, only the number of bits of these words being used.

As a variation, the exploitation of number n2 (directly or after calculation of ratio k, FIG. 1) may take different forms. Number n2 may for example be compared with a range of acceptable values. The current number n2 may also be compared with the preceding value (or with several values). Number n2 may also be directly used to adapt in real time the number of provided bits, etc.

An advantage of the present invention is that it enables testing the entropy of a non-deterministic generator while requiring fewer calculation resources than conventional solutions.

Another advantage of the present invention is that the test can be integrated with the circuit generating in non-deterministic fashion the words exploited by the application.

Another advantage of the present invention is that it enables optimizing the entropy per bit by exploiting the result of the compression function to select the useful bits in words provided by a hash function supplied with the bits of the noise source.

Another advantage of the present invention is that it enables detecting a possible drift in the entropy of a non-deterministic generator throughout the product lifetime. This detection can be exploited either to warn the user, or to control in real time the number of bits of the generated words.

Of course, the present invention is likely to have various alterations, modifications, and improvements which readily occur to those skilled in the art. In particular, the selection of the number of bits exploited by the generator of the present invention depends on the application and especially on the number of desired bits for the words generated in non-deterministic fashion.

Such alterations, modifications, and improvements are intended to be part of this disclosure, and are intended to be within the spirit and the scope of the present invention. Further, the implementation of the present invention, be it by hardware or software means, is within the abilities of those skilled in the art based on the functional indications given hereabove.

Accordingly, the foregoing description is by way of example only and is not intended to be limiting. The present invention is limited only as defined in the following claims and the equivalents thereto.

What is claimed is:

1. A method of non-deterministic word generation from a noise source providing a bit flow, comprising:
    parallelizing, by a temporary storage device, the bit flow provided by the noise source to obtain first words, each first word having a first number of bits;
    applying, by a compression circuit, to said first words a compression function providing second words, each second word having a second number of bits, and, separately from applying to said first words a compression function, applying, by a diffusion/confusion circuit, to said first words a diffusion/confusion function providing third words, each third word having a third number of bits, the first words being input to the compression circuit and to the diffusion/confusion circuit in parallel; and
    selecting a second number of bits from an output of the diffusion/confusion circuit based on an output of the compression circuit, the selecting performed by a selection circuit, wherein the entropy per bit of the noise source is optimized by using the output of the compression circuit to select useful bits in the third words provided by the diffusion/confusion circuit, wherein a drift in the entropy of the noise source can be detected.

2. The method of claim 1, wherein the diffusion/confusion function is a hash function, preferably selected from among functions SHA1 and MD5.

3. The method of claim 1, wherein the diffusion/confusion function is a ciphering algorithm, preferably, of DES type.

4. A non-deterministic generator of numbers from a noise source providing a bit flow, comprising:
    a temporary storage device configured to parallelize the bit flow from the noise source and to provide first words;
    a compression circuit configured for compressing said first words, each first word having a first number of bits obtained from the noise source, and providing second words, each second word having a second number of bits;
    a diffusion/confusion circuit, separate and distinct from the compression circuit, configured for diffusion/confusion of said first words to provide third words, each third word having a third number of bits, the first words being input to the compression circuit and to the diffusion/confusion circuit in parallel; and
    a selection circuit configured to select a second number of bits from an output of the diffusion/confusion circuit based on an output of the compression circuit, wherein the entropy per bit of the noise source is optimized by using the output of the compression circuit to select useful bits in the third words provided by the diffusion/confusion circuit, wherein a drift in the entropy of the noise source can be detected.

5. The generator of claim 4, wherein the diffusion/confusion function is a hash function, preferably selected from among functions SHA1 and MD5.

6. The generator of claim 4, wherein the diffusion/confusion function is a ciphering function, preferably of DES type.

7. The generator of claim 4, wherein the compression function is a Huffman function.

8. A method of non-deterministic word generation from a noise source providing a bit flow, the method comprising:
    deriving, by a temporary storage device, from the bit flow first words, wherein each first word includes a first number of bits;
    applying, by a compression circuit, to the first words a compression function;
    applying separately from applying to the first words a compression function, by a diffusion/confusion circuit, to the first words a diffusion/confusion function, the first words being input to the compression circuit and to the diffusion/confusion circuit in parallel;
    wherein applying the compression function to the first words results in second words, each second word having a second number of bits;
    wherein applying the diffusion/confusion function to the first words results in third words, each third word having a third number of bits;
    determining, by an evaluating circuit, the second number of bits in each of the second words; and
    selecting a second number of bits from an output of the diffusion/confusion circuit based on an output of the evaluating circuit, the selecting performed by a selection circuit, wherein the entropy per bit of the noise source is optimized by using the output of the compression circuit to select useful bits in the third words provided by the diffusion/confusion circuit, wherein a drift in the entropy of the noise source can be detected.

9. The method of claim 8, wherein the diffusion/confusion function is a hash function.

10. The method of claim 9, wherein the hash function is selected from among functions SHA1 and MD5.

11. The method of claim 8, wherein the diffusion/confusion function is a ciphering function.

12. The method of claim 11, wherein the ciphering function is of DES type.

13. A non-deterministic generator of numbers from a noise source providing a bit flow, the generator comprising:
    a storage device wherein the bit flow is parallelized to obtain first words, each first word including a first number of bits;
    a compression circuit configured to apply a compression function to the first words, resulting in second words;
    a diffusion/confusion circuit, separate and distinct from the compression circuit, configured to apply a diffusion/confusion function to the first words, resulting in third words, the first words being input to the compression circuit and to the diffusion/confusion circuit in parallel;
    an evaluating circuit configured to determine a second number of bits in the second words; and
    a selection circuit configured to select a second number of bits from an output of the diffusion/confusion circuit based on an output of the evaluating circuit, wherein the entropy per bit of the noise source is optimized by using the output of the compression circuit to select useful bits in the third words provided by the diffusion/confusion circuit, wherein a drift in the entropy of the noise source can be detected.

14. The generator of claim 13, wherein the diffusion/confusion function is a hash function.

15. The generator of claim 14, wherein the hash function is selected from among functions SHA1 and MD5.

16. The generator of claim 13, wherein the diffusion/confusion function is a ciphering function.

17. The generator of claim 16, wherein the ciphering function is of DES type.

18. The generator of claim 13, wherein the compression function is a Huffman function.

19. The generator of claim 13, wherein the compression function and the diffusion/confusion function are applied in parallel to the first set of words.

* * * * *